United States Patent
Oenning et al.

(10) Patent No.: US 8,947,806 B1
(45) Date of Patent: Feb. 3, 2015

(54) CROSS-TALK COMPENSATION IN ARRAY BASED READER SYSTEMS

(71) Applicant: LSI Corporation, San Jose, CA (US)

(72) Inventors: Travis Roger Oenning, Rochester, MN (US); George Mathew, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/225,543

(22) Filed: Mar. 26, 2014

Related U.S. Application Data (60) Provisional application No. 61/939,192, filed on Feb. 12, 2014.

(51) Int. Cl.
*G11B 5/09* (2006.01)

(52) U.S. Cl.
USPC ................................. 360/39; 360/46

(58) Field of Classification Search
USPC .......................... 360/39, 29, 77.12
See application file for complete search history.

(56) References Cited

U.S. PATENT DOCUMENTS

| | | | |
|---|---|---|---|
| 4,953,041 A | | 8/1990 | Huber |
| 5,679,027 A | | 10/1997 | Smith |
| 6,028,727 A | * | 2/2000 | Vishakhadatta et al. ........ 360/51 |
| RE36,671 E | * | 4/2000 | Minuhin et al. ................ 360/46 |
| 6,111,712 A | * | 8/2000 | Vishakhadatta et al. ........ 360/51 |
| 6,239,936 B1 | * | 5/2001 | Abraham et al. ............... 360/75 |
| 6,590,734 B1 | * | 7/2003 | Ell ............................ 360/78.05 |
| 7,372,791 B2 | | 5/2008 | Hirasaka |
| 7,831,647 B1 | | 11/2010 | Lam |
| 2002/0036857 A1 | * | 3/2002 | Teo et al. ........................ 360/66 |
| 2007/0019316 A1 | * | 1/2007 | Norton, Jr. ...................... 360/29 |
| 2007/0042717 A1 | * | 2/2007 | Alexiou et al. ................. 455/69 |
| 2007/0085709 A1 | * | 4/2007 | Coene et al. .................... 341/50 |
| 2010/0150279 A1 | * | 6/2010 | Arar ............................. 375/340 |
| 2014/0064050 A1 | | 3/2014 | Saito |
| 2014/0160590 A1 | * | 6/2014 | Sankaranarayanan et al. . 360/45 |

OTHER PUBLICATIONS

Capacity Advantage of Array-Reader-Based magnetic Recording (Armr) for Next Generation Hard Disk Drive, George Mathew et al, IEEE Transaction on Magnetics, vol. 50, no. 3, Mar. 2014.*

George Mathew et al., Capacity Advantage of Array-Reader Based Magnetic Recording for Next Generation Hard Disk Drives, Digests of the 24th Magnetic Recording Conference TMRC 2013, Aug. 20-22, 2013, pp. i-ii, 1, and 58-59.

Nuno Miguel De Figueiredo Garrido, Available Techniques for Magnetic Hard Disk Drive Read Channel Equalization, NM de Figueiredo Garrido, Jul. 8, 2013, pp. 1-13.

* cited by examiner

*Primary Examiner* — Tan X Dinh (57) ABSTRACT

A method of enhancing read performance in array-reader hardware includes generating, by the array-reader hardware, a plurality of signals, according to data read from a magnetic disk, and canceling at least a portion of cross-talk in the plurality of signals to generate a plurality of corrected signals.

19 Claims, 7 Drawing Sheets

CROSS-TALK COMPENSATION IN ARRAY BASED READER SYSTEMS

CROSS-REFERENCE TO RELATED APPLICATIONS

This application claims the benefit of U.S. Provisional Patent Application No. 61/939,192 filed on Feb. 12, 2014, the complete disclosure of which is expressly incorporated by reference herein in its entirety for all purposes.

FIELD OF INVENTION

The present invention relates generally to electrical and electronic circuitry, and more particularly relates to reading a magnetic recording medium in a system having multiple readers.

BACKGROUND

The magnetic disk drive recording industry continues to pursue advances in technology that will sustain enhancements in recording density in a cost-effective manner. Two approaches currently under investigation are bit patterned media recording (BPMR) and heat-assisted magnetic recording (HAMR). An objective of these approaches is to overcome challenges posed by the super-paramagnetic limit that imposes a trade-off among three fundamentally competing recording parameters: media signal-to-noise ratio (SNR), writability, and thermal stability. BPMR and HAMR, however, require modifications to the media and heads, which significantly increase costs. Another technology, two-dimensional magnetic recording (TDMR), which uses conventional media and a new multiple-head configuration, relies on powerful signal processing in an attempt to achieve a theoretical limit of one bit-per-grain recording density.

As a practical milestone, array-reader based magnetic recording (ARMR) has been proposed to increase areal density with an array-reader and associated signal processing.

SUMMARY

In accordance with an embodiment of the invention, a method of enhancing read performance in array-reader hardware includes generating, by the array-reader hardware, a plurality of signals, according to data read from a magnetic disk, and canceling at least a portion of cross-talk in the plurality of signals to generate a plurality of corrected signals. Additional and/or other embodiments of the invention are described in the following written description, including the claims, which is to be read in connection with the accompanying drawings.

BRIEF DESCRIPTION OF THE FIGURES

The following drawings are presented by way of example only and without limitation, wherein like reference numerals (when used) indicate corresponding elements throughout the several views, and wherein.

It is to be appreciated that the drawings described herein are presented for illustrative purposes only. Moreover, common but well-understood elements and/or features that may be useful or necessary in a commercially feasible embodiment may not be shown in order to facilitate a less hindered view of the illustrated embodiments.

Written Description

Embodiments of the invention will be described herein in the context of illustrative array-reader based magnetic recording (ARMR) systems for use, for example, in a data storage application. It should be understood, however, that embodiments of the invention are not limited to these or any other particular ARMR arrangements. Rather, embodiments of the invention are more broadly applicable to techniques for improving read performance of a magnetic storage device. In this regard, embodiments of the invention provide an apparatus and methodology for beneficially compensating for cross-talk in array-reader based systems. Moreover, it will become apparent to those skilled in the art given the teachings herein that numerous modifications can be made to the illustrative embodiments shown that are within the scope of the claimed invention. That is, no limitations with respect to the embodiments shown and described herein are intended or should be inferred.

As a preliminary matter, for purposes of clarifying and describing embodiments of the invention, the following table provides a summary of certain acronyms and their corresponding definitions, as the terms are used herein:

Table of Acronym Definitions

| Acronym | Definition |
| --- | --- |
| BPMR | bit patterned media recording |
| HAMR | heat-assisted magnetic recording |
| SNR | signal-to-noise ratio |
| TDMR | two-dimensional magnetic recording |
| ARMR | array-reader based magnetic recording |
| PMR | perpendicular magnetic recording |
| TP | track pitch |
| CTC | cross-talk cancelation |

-continued

Table of Acronym Definitions

| Acronym | Definition |
|---------|------------|
| AFE | analog front end |
| ACC | alternating current coupling |
| CTF | continuous-time filter |
| ADC | analog-to-digital converter |
| D | delay |
| k | time (or tap) index |
| DFIR | digital finite impulse response |
| PR | partial response |
| ASIC | application specific integrated circuit |
| DTS | down-track separation (between readers) |
| CTS | cross-track separation (between readers) |
| BER | bit error rate |
| LMS | least means square |

As previously stated, one problem with bit patterned media recording (BPMR) and heat-assisted magnetic recording (HAMR) is that these approaches require substantial modifications to the media and heads, which significantly increase costs. ARMR is seen as an intermediate approach between current perpendicular magnetic recording (PMR) and two-dimensional magnetic recording (TDMR), which provides a significant increase in storage density compared to PMR while avoiding the challenges posed by BPMR and HAMR. ARMR uses standard media and an array of read-elements, also referred to herein as an array-reader, in conjunction with changes in read-back signal processing to achieve improved signal-to-noise ratio (SNR) of a track that is being read.

ARMR achieves areal density gain by employing multi-dimensional joint signal processing of multiple read-back signals from the array reader. Embodiments of the invention are shown and described herein in the context of an array-reader including two read-elements (i.e., readers).

TDMR is a known recording architecture intended to support storage densities beyond those of conventional recording systems. TDMR utilizes multiple read-elements to read from multiple adjacent tracks and uses joint signal processing and detection to decode the signal from a target track. The gains achieved from TDMR come primarily from more powerful coding and signal processing algorithms that allow data bits to be stored more densely on a magnetic storage medium (e.g., disk). In traditional disk architectures with a single read-element, reading a single sector with TDMR generally involves reading the sectors on adjacent tracks, requiring additional disk rotations. To circumvent this problem, TDMR disk drives may use multiple read-elements, also referred to as an array-reader, on the same support arm, typically referred to as a slider, thus restoring traditional read service times through ARMR processes.

It is to be appreciated that ARMR and TDMR do not have to be employed in substitution for HAMR or BPMR. Rather, according to an embodiment of the present invention, ARMR and TDMR can be implemented in conjunction with BPMR and HAMR as well. For example, ARMR/TDMR can be used for BPMR where track pitch is high (i.e., exceeding a prescribed value).

Figure 1:
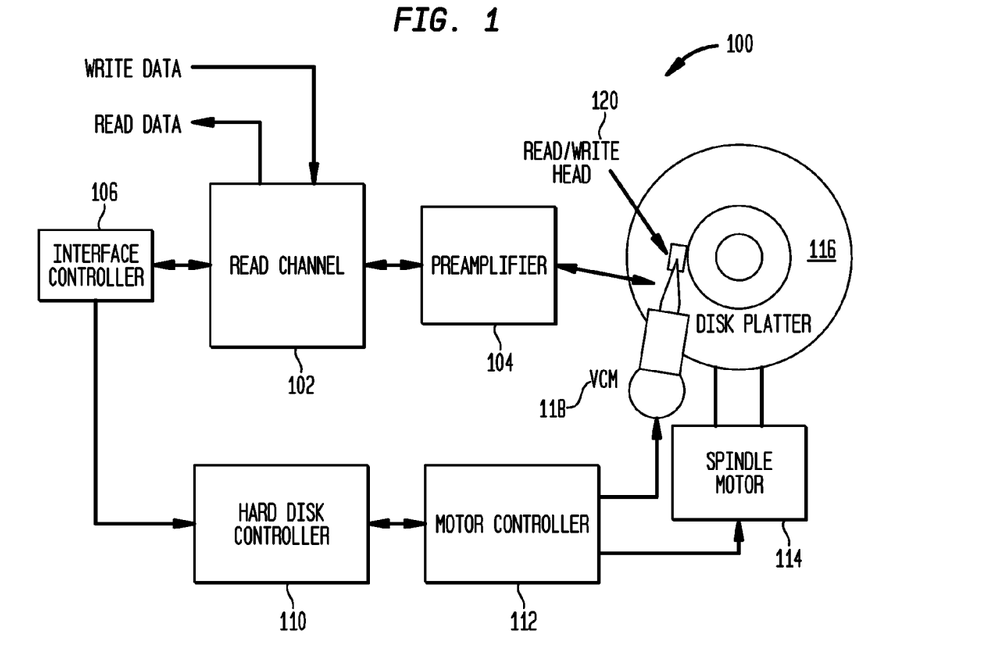
FIG. 1 depicts an exemplary storage device including an array-reader with cross-talk cancelation circuitry in accordance with one or more embodiments of the present invention.

Turning to FIG. 1, a storage system 100 including a read channel circuit 102 with cross-talk cancelation circuitry is shown in accordance with some embodiments of the present invention. Storage system 100 also includes a preamplifier 104, an interface controller 106, a hard disk controller 110, a motor controller 112, a spindle motor 114, a disk platter 116, and a read/write head assembly (or array-reader) 120. The read/write head assembly 120 includes an array of readers or multiple read sensors in ARMR. According to exemplary embodiments of the invention, the read/write head assembly 120 includes an array of readers or multiple read heads in ARMR and a separate writer or write head (not explicitly shown, but implied). It should be understood that embodiments of the present invention are not limited to any particular read/write head assembly described herein, and that other configurations of read/write head assemblies are considered embodiments of the invention consistent with ARMR. In one embodiment, the interface controller 106 controls addressing and timing of data to and from the disk platter 116. The data on the disk platter 116 can be stored in the form of magnetic signals recorded in accordance with either a longitudinal or a perpendicular recording scheme. The data can be recovered or detected by the read/write head assembly 120 when the assembly is properly positioned over the disk platter 116. In one embodiment, the read/write head assembly 120 includes a voice coil motor (VCM) control module 118. The position of the read/write head assembly 120 can be determined by the motor controller 112, the VCM control module 118, a dedicated sensor (not explicitly shown, but implied), etc. It is to be understood that embodiments of the invention are not limited to any specific storage system and that this disclosure is intended to cover any and all adaptations or variations of various embodiments configured to perform cross-talk cancelation operations.

The read/write head assembly 120 (hereinafter referred to as the array-reader) of ARMR systems output more than one reader signal. In one or more embodiments, these reader signals are sent by a transmission line (not explicitly shown, but implied) to a preamplifier 104 and subsequently from the preamplifier 104 to a read channel 102 where signal processing takes place. The array-reader 120, the transmission line(s) (not explicitly shown, but implied), and the preamplifier 104 can each introduce performance degrading cross-talk. More particularly, cross-talk can be introduced into the system by coupling (e.g., capacitive or inductive coupling) occurring at any point between the array-reader 120 and the preamplifier 104, including between the different readers of the array-reader 120, and between transmission lines in close proximity conducting signals from the readers to the preamplifier 104.

Figure 2:
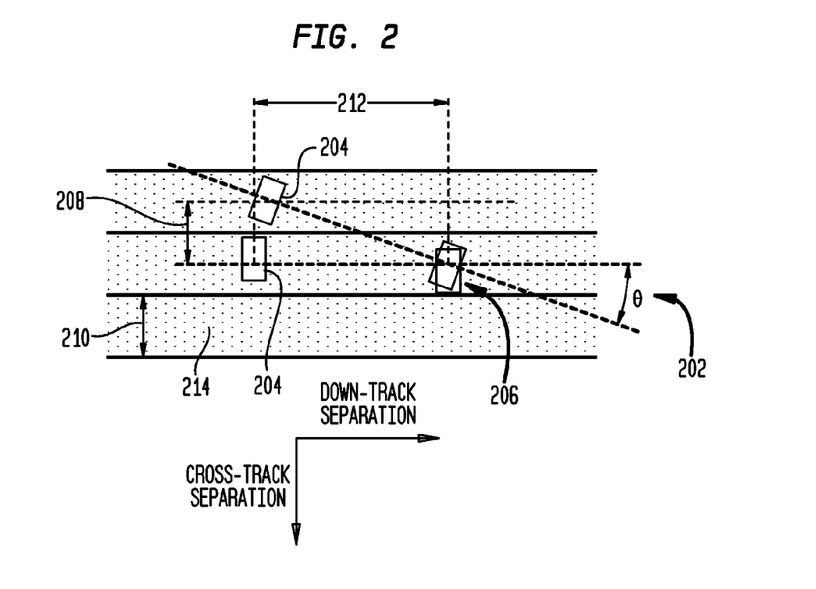
FIG. 2 is a top plan view conceptually illustrating how reader cross-track separation (CTS) varies with skew angle for an exemplary multi-reader head.

FIG. 2 is a top plan view which conceptually illustrates how reader cross-track separation (CTS) varies with skew angle 202. In FIG. 2, an array-reader is illustrated being disposed at two different skew angles; namely, 0 and θ degrees. It follows that the difference between the two different skew angles is θ 202. The array-reader includes two readers, 204 and 206, shown disposed relative to one another for each of the two skew angles. A certain CTS 208 occurs between the two readers given the skew angle θ. Note, that down-track separation (DTS) 212 decreases with increasing skew angle. It should also be understood that, in one or more embodiments, CTS and DTS are measured in terms of track pitch (TP) 210 (three tracks, e.g., 214, are shown in FIG. 2). For example, DTS=2TP means that the down-track separation of two readers of the array-reader is equal to two times the track pitch, at a particular skew angle.

Figure 3:
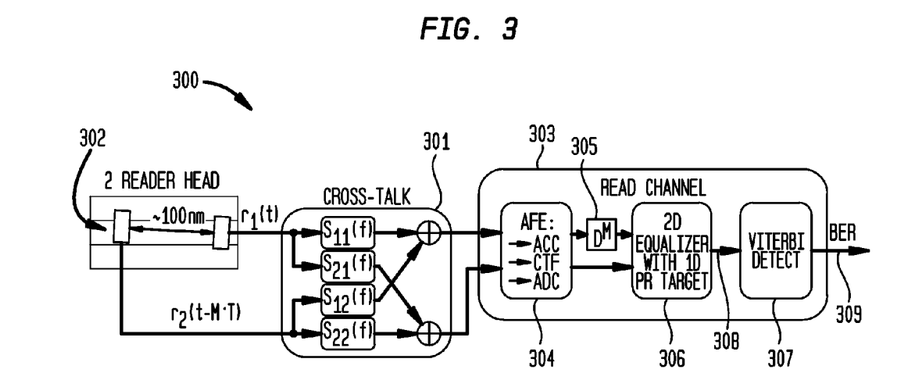
FIG. 3 illustrates a model of cross-talk in accordance with one or more embodiments of the present invention.

According to embodiments of the present invention, FIG. 3 depicts an exemplary system 300 including a model of cross-talk 301 between an array-reader 302 and a read channel 303. Also shown in FIG. 3 is first signal $r_1(t)$ (signal $r_1$ at continuous time t) generated by a first reader and a second signal $r_2(t-M \cdot T)$ generated by a second reader. In relation to given data written to the disk platter (or alternative storage medium), the second signal has a delay relative to the first signal (recall that the disk platter is spinning relative to the array-reader 302) due to the DTS of the readers, among other factors (e.g., transmission line delays, etc.). In FIG. 3, the delay is shown as a bit-time delay MT, where M is an integer representing a number of bits (e.g., the second reader will read the given data 10 bits after the first reader) and T is bit time or the time needed to read each bit. For example, if M=10 and T=10 nanoseconds, then M*T is a 100 nanosecond delay (i.e., the time difference between when the first reader reads the given data and when the second reader reads the given data). It should be understood that cross-talk affects the signals at a same moment in continuous time when the first signal $r_1(t)$ and the second signal $r_2(t-M \cdot T)$ contain different data due to the delay in reading caused by the DTS of the readers.

The model of cross-talk 301 models the transfer function between the readers and the read channel as a 2×2 matrix. According to embodiments of the present invention, the model can be generated for a respective device based on data provided by a manufacturer, by testing a specific device or groups of devices, etc., to determine a baseline cross-talk attributable to the hardware between a respective reader and the read channel 303. It should be understood that in one or more embodiments, the model is only used for testing and simulating an expected behavior and performance of a device, and is not a physical element/component of the system. The amount of cross-talk in a device will inherently be, to at least some extent, a function of the manufacture of the device. Consequently, a model (or estimate) of expected cross-talk in the system may be generated using manufacturing information corresponding to the device. A compensation circuit, described herein, is constructed using knowledge of the cross-talk attributable to the hardware and compensates for the cross-talk occurring in the system (see below). Because the behavior of the cross-talk in the device can change with time, for example with temperature, the compensation circuit is configured to adaptively track time-varying conditions (e.g., temperature).

According to embodiments of the present invention, the read channel 303 includes an analog front end (AFE) 304, which includes an alternating current coupling (ACC) operating as a high-pass filter to remove any direct current offset in the signal, a continuous time filter (CTF) operating to filter undesirable noise from the received analog signal, and an analog-to-digital converter (ADC) that converts the continuous analog signal into a series of corresponding digital samples. The read channel 303 includes a delay circuit 305 ($D^M$ denotes delay by M bit-times) delaying the first signal $r_1$. The read channel 303 includes a two-dimensional (2D) equalizer 306 (described with reference to FIG. 6 below) with a one-dimensional (1D) partial response (PR) target and a Viterbi detector 307 for detecting and outputting user data 309. The read channel 303 receives the plurality of signals from the array-reader and equalizes those to read data 308. The user data 309 output by the Viterbi detector 307 has a bit-error rate (BER) associated therewith.

In one embodiment, the 2D equalizer (306) outputs a combined signal (read data 308) generated by combining outputs generated from the first signal and the second signal, wherein the combined signal is provided to the detector (307), which outputs user data as shown in FIG. 3. In another embodiment, the 2D equalizer (306) outputs two signals, each output signal corresponding to a respective one of the first and the second input signals, wherein the output signals are provided to respective detectors (307), one detector for each output signal of the 2D equalizer. Other embodiments will be appreciated by one skilled in the art without departing from the teachings of the invention.

Figure 4:
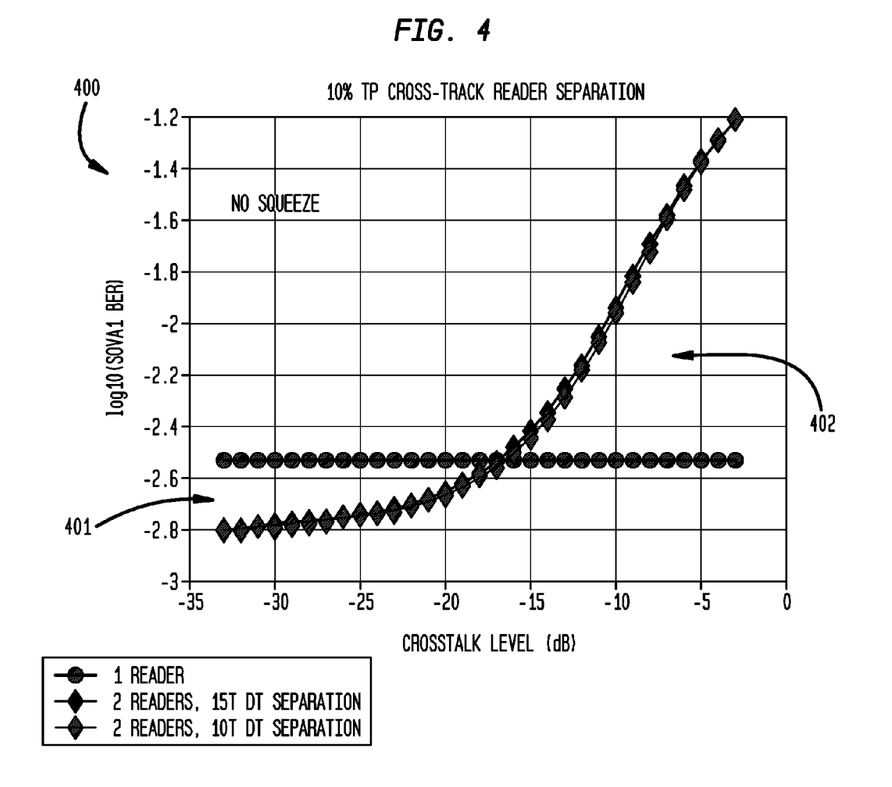
FIG. 4 is a graph of bit error rate (BER) versus cross-talk in accordance with one or more embodiments of the present invention.

FIG. 4 is a graph 400 conceptually depicting the effect of cross-talk on the BER for the illustrative case of no squeeze (e.g., no track overlap). The area 401 (i.e., the 2 reader points below the 1 reader plot) represent an improvement (i.e., a reduction) in BER relative to a one reader head, while area 402 (i.e., points above the 1 reader plot) represent an increase in BER relative to the one reader head. Two plots are given for two reader heads, one for an array-reader having 15T of down-track separation (DTS), and one for an array-reader having a DTS of 10T. It can also be seen that the array-reader having 10T DTS performs slightly better than the array-reader having 15T DTS. From FIG. 4 it can be seen that there is a significant potential loss incurred due to cross-talk in a multiple read-head system.

According to embodiments of the present invention, in an ARMR system, the effects of cross-talk can be mitigated through a variety of methods. In one embodiment, improved signal equalization overcomes cross-talk (see for example, FIGS. 3, 6-8 and 10). In another embodiment, cross-talk is canceled from the signal (see for example, FIGS. 9-11). It should be understood that signal equalization and cross-talk cancelation can be implemented in the same device, for example, where cross-talk cancelation is applied to remove a first portion of cross-talk, followed by a DFIR filter in the signal equalization to remove a second portion of the cross-talk.

Referring to the mitigation of cross-talk through improved signal detection using signal equalization, according to one or more embodiments of the present invention, improved signal detection reduces BER in the presence of cross-talk using DFIR filters having shifted taps, also called re-centered taps. The DFIR filters output a weighted sum of a current and a finite number of previous values of an input. The DFIR filter can be updated over the lifetime of the hardware as performance or system characteristics change. According to an embodiment of the present invention, the DFIR taps are updated on the order of a bit-time, and from sector to sector during read operations. The DFIR taps are determined using well-known methods such as a least means square (LMS) algorithm. LMS algorithms are stochastic gradient algorithms that iteratively update each tap weight of a filter in a direction of an instantaneous gradient of a squared error signal with respect to a current tap weight and as such can be used to design adaptive transversal (tapped-delay-line) filters. It should be understood that embodiments of the present invention are not limited to DFIR filters and that aspects of the present invention can be implemented with alternative means, such as, but not limited to, finite impulse response (FIR) filters.

Figure 5A:
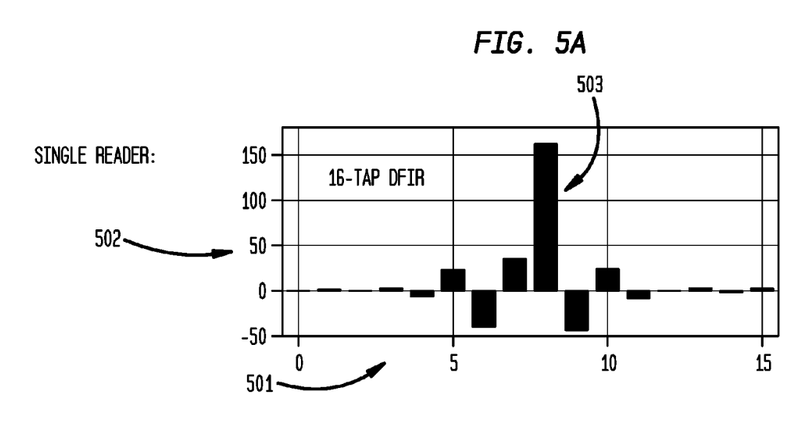
FIGS. 5A-B illustrate taps of digital finite impulse response (DFIR) filters in accordance with one or more embodiments of the present invention.
Figure 5B:
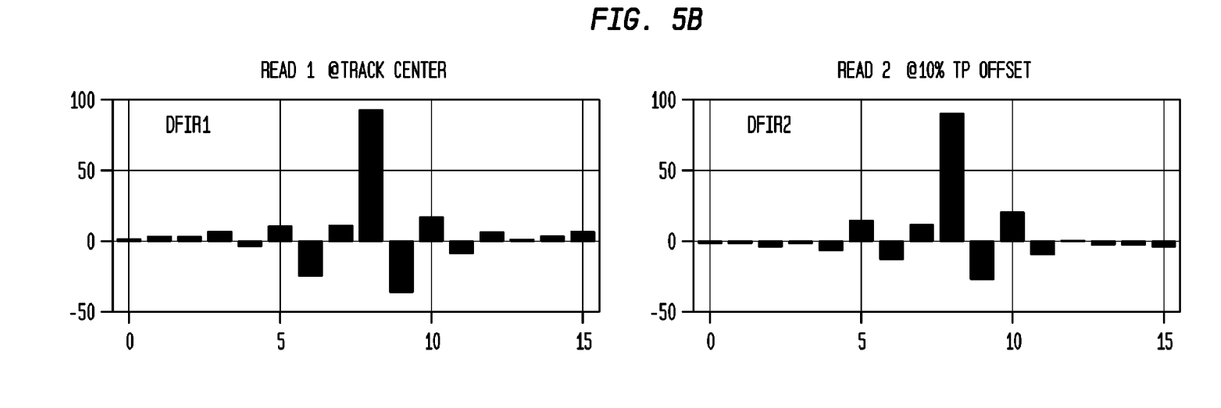

FIG. 5A illustrates a centered arrangement of taps for a DFIR filter for a one-reader head as delay (bit time) 501 versus tap weight (amplitude) 502 or filter coefficient. The height of each tap, e.g., 503, illustrates a tap's relative weight. FIG. 5B illustrates filters for a two-reader head, wherein different filters are used for each reader, and the filters may be configured for a certain CTS. The filters of FIG. 5B employ a centered-tap arrangement.

Figure 6:
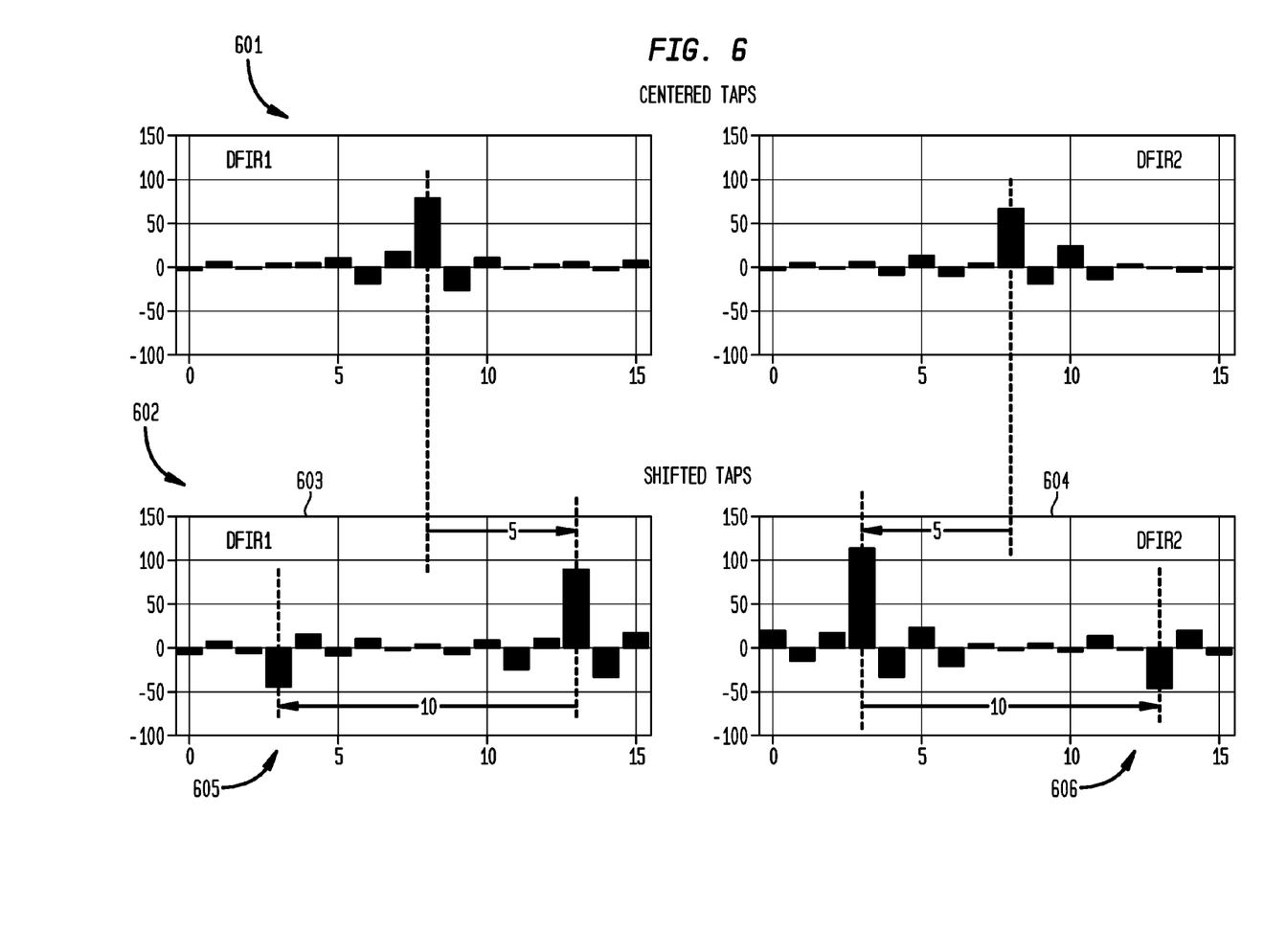
FIG. 6 illustrates shifted taps of DFIR filters in accordance with one or more embodiments of the present invention.

FIG. 6 is diagram showing DFIR taps for an exemplary ARMR system without and with cross-talk mitigating configurations (e.g., 601 and 602, respectively) for the case of −6 dB cross-talk and DTS of 10T. In an ARMR system in accordance with one or more embodiments of the invention, each signal generated by the array-reader is input to a respective DFIR filter. For example, in the case of an array-reader having two readers as shown in FIG. 3, a first DFIR filter (e.g., 603) and a second DFIR filter (e.g., 604) are implemented. In one or more embodiments of the present invention, the DFIR filters 603 and 604 are implemented in the equalizer 306 of FIG. 3. In each DFIR filter, the samples of a respective signal are weighted by tap values and summed. The outputs of the different DFIR filters 603 and 604 are combined (e.g., added) to output a read signal having a decreased BER (i.e., as compared to a read/write head assembly having a single reader).

Furthermore, according to one or more embodiments of the present invention, the tap values of respective DFIR filters are shifted (e.g., 602), as compared to a configuration having centered taps (e.g., 601). By shifting the taps values in the DFIR filters, the delay between different signals can be reduced or eliminated and any cross-talk in the different signals can be mitigated. That is, the effective delay through each of DFIR1 603 and DFIR2 604 can be independently modified by shifting the tap values; the filter delay is increased or decreased by shifting the tap values to the right or left, respectively. As an example, in DFIR1 603, which is applied to a first signal (e.g., $r_1(t)$), a delay is increased by 5 bit times, and in DFIR2 604, which is applied to a second signal (e.g., $r_2(t-M \cdot T)$) a delay is decreased by 5 bit times (relative to configuration 601). The combined effect of shifting the tap values in DFIR1 603 and DFIR2 604 is to eliminate the 10 bit time delay between the signals arising from the DTS of the readers.

Furthermore, the shifted tap values allow the DFIR1 603 and DFIR2 604 to mitigate cross-talk as evidenced by increased tap values observed 10 bit times earlier in DFIR1 603 (at 605) and 10 bit times later in DFIR2 604 (at 606). More particularly, the non-zero tap weights located at 605 and 606 are generated by the LMS algorithm to mitigate the cross-talk in the respective signals such that DFIR1 603 and DFIR2 604 generate a plurality of corrected signals. That is, once the DFIR filter is constructed with shifted tap values, the LMS algorithm works to determine the tap-weights to perform the cross-talk mitigation function in addition to the equalization function of the equalizer module 306 (see FIG. 3). The corrected signals are combined by the equalizer 306 to output the read signal 308 (see FIG. 3).

In one or more embodiments of the present invention, where the DFIR taps apply a delay to the signals, the delay circuit 305 of the read channel 303 can be omitted or switched off (see FIG. 3).

Figure 7:
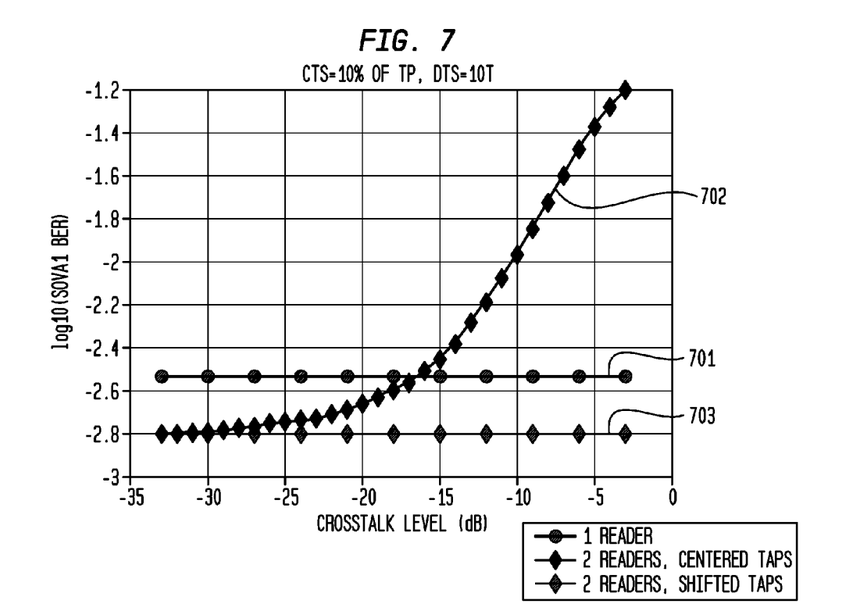
FIGS. 7 and 8 are graphs of BER versus cross-talk in accordance with one or more embodiments of the present invention.
Figure 8:
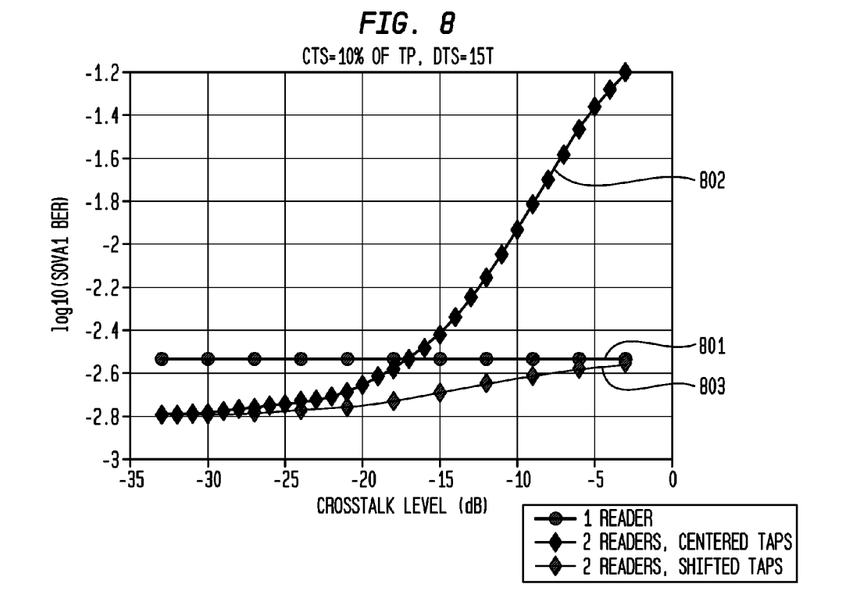

FIGS. 7 and 8 are exemplary plots of BER versus cross-talk for different systems with a 10T DTS and a 15T DTS, respectively. In both FIGS. 7 and 8, CTS is 10% of track pitch. As apparent from FIG. 7, the one-reader system 701 has a constant BER, a two-reader system using DFIR filters having centered taps has a BER 702 that worsens with cross-talk, and a two-reader system using DFIR filters having shifted taps has a constant BER 703, lower than the BER of the one-reader system. In FIG. 8, the one-reader system 801 has a constant BER, a two-reader system using DFIR filters having centered taps has a BER 802 that worsens with cross-talk, and a two-reader system using DFIR filters having shifted taps has improved BER 803, lower than the BER of the one-reader system for all measured cross-talk levels.

It should be understood that while the present invention discusses exemplary embodiments implementing DFIR filters, exemplary methods described herein can be implemented using analog finite impulse response techniques and circuitry.

Figure 9:
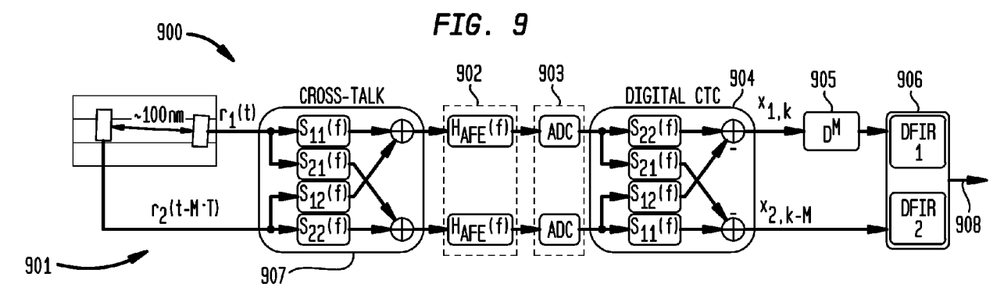
FIG. 9 illustrates a system including cross-talk cancelation features in accordance with one or more embodiments of the present invention.

Referring now to the mitigation of cross-talk through cross-talk cancelation, according to one or more embodiments of the present invention, FIG. 9 shows an ARMR system 900 comprising an array-reader 901, a first pair of filters ($H_{AFE}(f)$) 902 of the AFE coupled with the array-reader, a first pair of ADCs 903 coupled with the first pair of filters, a cross-talk canceling module 904 coupled with the first pair of ADCs, a delay circuit 905 coupled with the cross-talk canceling module, and a two-dimensional equalizer 906 coupled with the delay circuit. Also shown in FIG. 9 is a block illustrating cross-talk model 907 in the system 900. It should be understood that cross-talk can occur throughout a signal path and the model 907 captures cross-talk between the array-reader and the cross-talk canceling module 904, and in particular between the array-reader and the first pair of ADCs 903.

In the exemplary schematic shown in FIG. 9, a first signal $r_1(t)$ is generated by a first reader and a second signal $r_2(t-M \cdot T)$ is generated by a second reader.

It should be understood that cross-talk affects the signals at a same moment in continuous time when the first signal $r_1(t)$ and the second signal $r_2(t-M \cdot T)$ contain different data due to the delay in reading caused by the DTS of the readers, among other factors (e.g., transmission line delays in the signal path). According to an embodiment of the present invention, the cross-talk cancelation is applied to the first signal $r_1(t)$ and the second signal $r_2(t-M \cdot T)$ before realigning the data (e.g., adding a delay to the first signal $r_1(t)$) so that there is no delay between the signals. While in some embodiments cross-talk cancellation is applied to each signal, in at least another embodiment cross-talk cancellation is applied to only one of the signals.

The model of cross-talk 907 models the transfer function between the readers 901 and the read channel (e.g., in one or more embodiments, the ADC 903) as a matrix of transfer functions. It should be understood that in one or more embodiments of the present invention, the model of cross-talk 907 is not a component of a system, and is instead shown merely to clarify that the cross-talk canceling module 904 cancels cross-talk inherent in the system (i.e., the model of cross-talk 907).

According to an embodiment of the present invention, the first pair of filters ($H_{AFE}(f)$) 902 of the AFE perform antialiasing, for example, by low pass filtering. The first pair of ADCs 903 converts the continuous analog signals into a series of corresponding digital samples.

The cross-talk canceling module 904 applies an inverse matrix of the cross-talk model 907, thereby canceling/removing at least a portion of the cross-talk from the signals. The following equations define the illustrative cross-talk cancelation utilized by the cross-talk canceling module 904 of FIG. 9 according to one or more embodiments of the invention:

$$x_{1,k} = H_{AFE}(S_{11}S_{22} - S_{21}S_{12})r_1(kT)$$

$$x_{2,k-M} = H_{AFE}(S_{22}S_{11} - S_{12}S_{21})r_2(kT - M \cdot T).$$

It should be understood that cross-talk cancelation can be defined by different equations without departing from the scope of the present invention.

The cross-talk canceling module 904 outputs two corrected signals $x_{1,k}$ and $x_{2,k-M}$, where k is a time index (e.g., an integer) indicating a particular sample. Components $S_{ij}(f)$ are transfer functions where $S_{11}$ and $S_{22}$ are pass-through transfer functions and $S_{21}$ and $S_{it}$ are cross-coupling transfer functions that result in cross-talk.

The delay circuit 905 ($D^M$, where M is an integer) delays the signal $x_{1,k}$ prior to inputting the signal $x_{1,k}$ to the equalizer 906, where the equalizer 906 reshapes the waveform and outputs read data 908.

Figure 10:
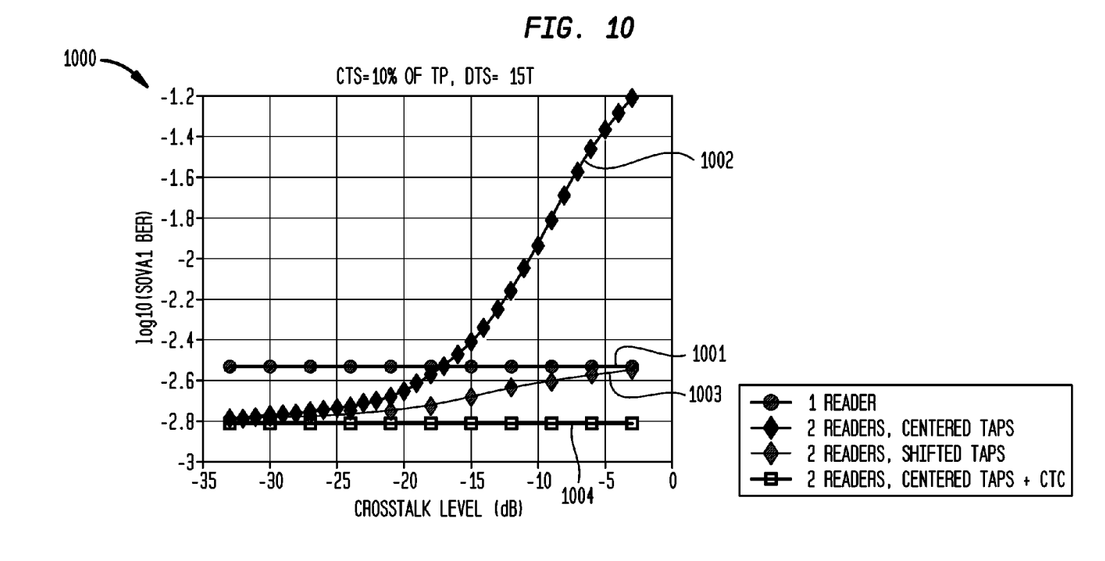
FIG. 10 is graph of BER versus cross-talk in accordance with one or more embodiments of the present invention.

FIG. 10 is a graph of BER versus cross-talk for an array-reader having a DTS of 15 T and a CTS of 10% of track pitch. As can be seen, a plot of a one-reader case 1001 is shown for purposes of comparison. As shown above, for an array-reader without cross-talk cancelation and with centered taps 1002, performance worsens with cross-talk. An array-reader without cross-talk cancelation and with shifted taps 1003 shows improved BER as compared to the one-reader case for all cross-talk levels. An array-reader with cross-talk cancelation and with centered taps 1004 shows improved BER as compared to the one-reader case for all cross-talk levels.

Figure 11:
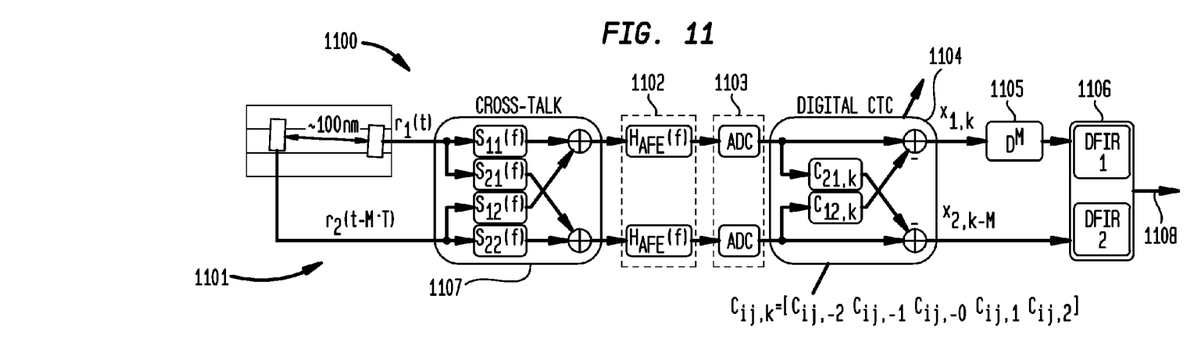
FIG. 11 illustrates a system including cross-talk cancelation features in accordance with one or more embodiments of the present invention.

According to one or more embodiments of the present invention, FIG. 11 shows an ARMR system 1100 comprising an array-reader 1101, a first pair of filters ($H_{AFE}(f)$) 1102 of the AFE, a first pair of ADC 1103, a cross-talk canceling module 1104, a delay circuit 1105, and a two-dimensional equalizer 1106 outputting read data 1108. Also shown in FIG. 11 is a block illustrating cross-talk 1107.

The cross-talk transfer functions can change with time, temperature, etc. Digital cross-talk cancelation (CTC) filters of the cross-talk canceling module 1104 are FIR (5-tap FIRs as illustrated in FIG. 11) and can be made adapt to time-varying conditions. According to one or more embodiments of the present invention, the cross-talk canceling module 1104 cancels cross-talk in signals according to the following equation:

$$c_{ij,k}=[c_{ij,-2}c_{ij,-1}c_{ij,-0}c_{ij,1}c_{ij,2}],$$

wherein c is a transfer function of a cancelation filter, i=1 or 2, j=2 or 1, and k is the time or tap index (in the example, the difference between −2 and 2 (i.e., 5) gives the size of the filter (i.e., 5 taps long)). The compact notation above may be re-written as:

$$c_{12,k}=[c_{12,-2}c_{12,-1}c_{12,0}c_{12,1}c_{21,2}], \text{and}$$

$$c_{21,k}=[c_{21,-2}c_{21,-1}c_{21,0}c_{21,1}c_{21,2}].$$

When enabled, cross-talk is subtracted off respective analog-to-digital converted samples. If the sum of the tap amplitudes of the cross-talk cancelation filter is less than a prescribed (e.g., programmed) threshold, analog-to-digital converted samples are not modified for that path.

Embodiments of the present invention are extendable to two or more readers, wherein the cross-talk among the multiple readers is modeling and used in designing an appropriate cross-talk cancelation filter.

As will be appreciated by one skilled in the art, embodiments of the present invention may be implemented as an apparatus, system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, embodiments of the present invention may take the form of a computer program product embodied in one or more non-transitory machine-readable medium(s) having machine-readable program code embodied thereon.

The block diagrams in the figures depict illustrative architectures, functionality, and operation of implementations of systems, methods and computer program products according to embodiments of the present invention. In this regard, each block shown in the block diagrams may represent a module, segment, or portion of code, which comprises one or more executable instructions for implementing specified functions. It should also be noted that, in one or more embodiments, functions represented by the blocks may occur out of the order noted in the figures. For example, two blocks shown in succession may, in fact, be executed substantially concurrently, or the blocks may sometimes be executed in the reverse order, depending upon the functionality involved. It will also be appreciated that each block of the block diagrams, and combinations of blocks in the block diagrams, can be implemented by special purpose hardware-based systems that perform the specified functions or acts, or combinations of special purpose hardware and computer instructions.

It should be understood that any of the methods described herein can include an additional step of providing a system comprising distinct software modules embodied on a non-transient computer-readable storage medium; the modules include, in one or more embodiments, any or all of the elements depicted in the block diagrams and/or described herein; by way of example and not limitation, a first module filtering a plurality of signals (see for example, block 1102, FIG. 11), a second module converting the plurality of signals to a digital domain (see for example, block 1103, FIG. 11), and a third module compensating for cross-talk in the plurality of signals (see for example, block 1104, FIG. 11). The method steps can then be carried out using the distinct software modules and/or sub-modules of the system, executing on one or more hardware processors. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASIC), functional circuitry, one or more appropriately programmed general purpose digital computers with associated memory, modules, and the like. Given the teachings of the invention provided herein, one of ordinary skill in the related art will be able to contemplate other implementations of the components of the invention.

In an integrated circuit implementation of one or more embodiments of the invention, multiple identical die are typically fabricated in a repeated pattern on a surface of a semiconductor wafer. Each such die may include a device described herein, and may include other structures and/or circuits. The individual dies are cut or diced from the wafer, then packaged as integrated circuits. One skilled in the art would know how to dice wafers and package die to produce integrated circuits. Any of the exemplary circuits illustrated in the accompanying figures, or portions thereof, may be part of an integrated circuit. Integrated circuits so manufactured are considered part of this invention.

Figure 12:
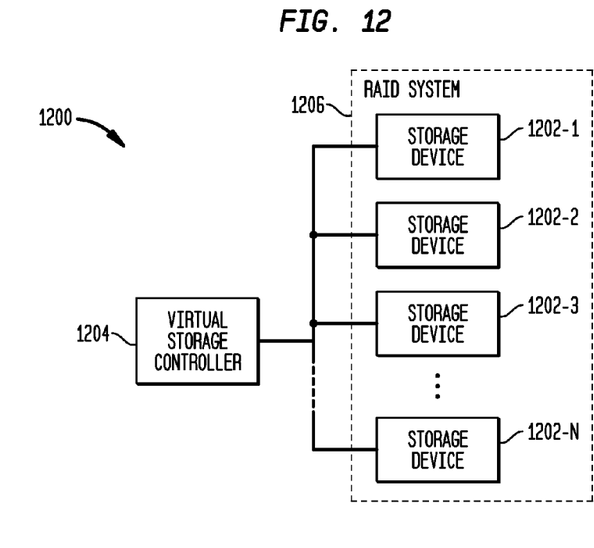
FIG. 12 is a block diagram depicting at least a portion of an exemplary virtual storage system comprising multiple storage devices, at least one of the storage devices incorporating techniques for implementing cross-talk cancelation for an array-reader according to an embodiment of the invention.

Embodiments of the invention are suitable for use in conjunction with a virtual storage system 1200 comprising multiple storage devices 1202-1 through 1202-N, possibly of multiple different types, as illustrated in FIG. 12. For example, the storage devices 1202-1 through 1202-N may be implemented using all hard disk drives (HDDs), all solid-state drives (SSDs), or using a combination of one or more HDDs and one or more SSDs. Other storage device types are similarly contemplated. The virtual storage system 1200, also referred to as a storage virtualization system, illustratively comprises a virtual storage controller 1204 coupled with a redundant array of independent devices (RAID) system 1206. As will be known by those skilled in the art, RAID is a storage technology that provides increased reliability, among other features, through redundancy. This is accomplished by combining multiple physical storage components (e.g., HDDs, SSDs, etc.) into a logical (i.e., virtual) unit, where data is distributed across the multiple storage components in one of a plurality of ways, generally referred to as "RAID levels." The RAID system 1206 more specifically comprises N distinct storage devices denoted 1202-1, 1202-2, . . . 1202-N, where N is an integer greater than one. As previously stated, all storage devices 1202-1 through 1202-N need not be of the same type. Furthermore, one or more of the storage devices 1202-1 through 1202-N of the RAID system 1206 are assumed to be configured to include apparatus and/or circuitry as disclosed herein. These and other virtual storage systems comprising multiple storage devices (e.g., HDDs, SSDs, or some combination of HDDs and SSDs), are considered embodiments of the invention.

The illustrations of embodiments of the invention described herein are intended to provide a general understanding of the structure of various embodiments, and they are not intended to serve as a complete description of all the elements and features of apparatus and systems that might make use of the structures described herein. Many other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other implementations and applications of the techniques of embodiments of the invention. Although illustrative embodiments of the invention have been described herein with reference to the accompanying drawings, it is to be understood that embodiments of the invention are not limited to those precise embodiments, and that various other changes and modifications are made therein by one skilled in the art without departing from the scope of the appended claims.

What is claimed is:

1. A method of enhancing read performance in array-reader hardware comprising:
   generating, by the array-reader hardware, a plurality of signals, according to data read from a magnetic disk; and
   canceling at least a portion of cross-talk in the plurality of signals to generate a plurality of corrected signals;
   wherein canceling at least the portion of the cross-talk comprises:
      applying a cross-talk cancelation filter to the plurality of signals, subtracting a first portion of the cross-talk from the plurality signals; and
      applying a digital finite impulse response filter to each of the plurality of signals, canceling a second portion of the cross-talk.

2. The method of claim 1, further comprising combining the plurality of corrected signals into read data.

3. The method of claim 1, further comprising delaying at least one of the plurality of corrected signals according to a down-track separation between a plurality of read heads of the array-reader hardware.

4. The method of claim 1, further comprising inputting the plurality of corrected signals to an equalizer.

5. The method of claim 1, wherein different digital finite impulse response filters are applied to different ones of the plurality of signals, each of the digital finite impulse response filters comprising a plurality of shifted taps;
   further comprising:
      determining a sum of tap amplitudes of the cross-talk cancelation filter; and
      passing the plurality of signals unmodified when the sum of the tap amplitudes is less than a prescribed threshold.

6. The method of claim 1, wherein canceling at least the portion of the cross-talk comprises applying a digital cross-talk cancelation filter to the plurality of signals subtracting the cross-talk from the plurality signals to generate the plurality of corrected signals.

7. The method of claim 6, further comprising delaying at least one of the plurality of signals according to a down-track separation between a plurality of read heads of the array-reader hardware after applying the digital cross-talk cancelation filter to the plurality of signals.

8. The method of claim 6, further comprising adapting the digital cross-talk cancelation filter to at least one time varying condition.

9. The method of claim 1,
   wherein different digital finite impulse response filters are applied to different ones of the plurality of signals, wherein each of the digital finite impulse response filters comprises a plurality of shifted taps.

10. A storage system comprising:
    an array-reader configured to generate a plurality of signals;
    a digital cross-talk cancelation filter configured to subtract a first portion of cross-talk from the plurality signals and to generate a plurality of corrected signals; and
    a plurality of digital finite impulse response filters configured to cancel a second portion of cross-talk from respective ones of the plurality of signals to generate the plurality of corrected signals.

11. The storage system of claim 10, further comprising a delay circuit configured to delay at least one of the plurality of corrected signals according to a down-track separation between a plurality of read heads of the array-reader.

12. The storage system of claim 10, further comprising an equalizer configured to reshape the plurality of corrected signals.

13. The storage system of claim 10, further comprising a low-pass filter disposed between the array-reader and an analog-to-digital converter, wherein the analog-to-digital converter is disposed between the low-pass filter and the digital cross-talk cancelation filter.

14. The storage system of claim 10, wherein the digital cross-talk cancelation filter is adaptive to at least one time varying condition.

15. A storage system comprising:
an array-reader configured to generate a plurality of signals; and
an equalizer comprising a plurality of digital finite impulse response filters configured to subtract cross-talk from respective ones of the plurality of signals and to generate a plurality of corrected signals;
wherein the plurality of digital finite impulse response filters is configured to adjust a delay of at least one of the plurality of signals according to a down-track separation between a plurality of read heads of the array-reader.

16. The storage system of claim 15, wherein the equalizer is configured to reshape the plurality of signals.

17. The storage system of claim 15, wherein the plurality of digital finite impulse response filters are adaptive to at least one time varying condition.

18. A data storage system, comprising:
a plurality of storage devices, wherein at least one of the plurality of storage devices comprises:
an array-reader configured to generate a plurality of signals; and
at least one of a digital cross-talk cancelation filter and a plurality of digital finite impulse response filters,
wherein the digital cross-talk cancelation filter is configured to subtract cross-talk from the plurality of signals and to generate a plurality of corrected signals, and the plurality of digital finite impulse response filters are configured to subtract the cross-talk from respective ones of the plurality of signals and to generate the plurality of corrected signals.

19. The data storage system of claim 18, wherein the at least one of the plurality of storage devices is configured as a device in a redundant array of independent devices (RAID) system.

* * * * *